June 17, 1941. P. B. STREANDER 2,246,224
DISPOSAL OF GARBAGE OR GARBAGE AND SEWAGE SLUDGE AND THE LIKE
Filed Oct. 27, 1937
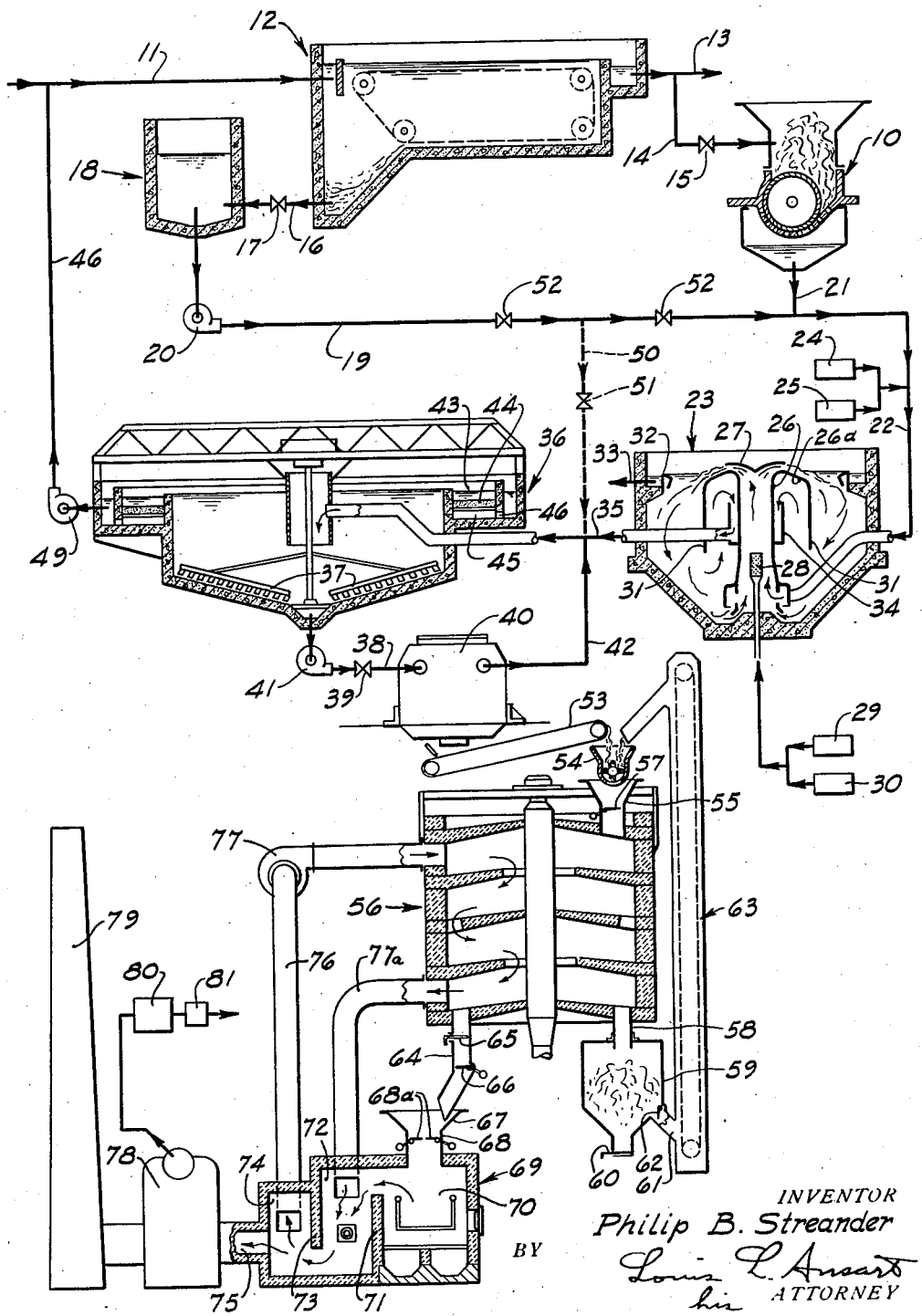
INVENTOR
Philip B. Streander
BY
Louis L. Ansart
his ATTORNEY Patented June 17, 1941

2,246,224

UNITED STATES PATENT OFFICE 2,246,224

DISPOSAL OF GARBAGE OR GARBAGE AND SEWAGE SLUDGE AND THE LIKE

Philip B. Streander, Maplewood, N. J., assignor to Municipal Sanitary Service Corporation, a corporation of New York Application October 27, 1937, Serial No. 171,271

4 Claims. (Cl. 210—2)

This invention relates to the disposal of waste material and more particularly to the disposal of garbage or garbage and sewage sludge.

The main object of the invention is to provide improved disposal of garbage. Another object of the invention is to provide improved disposal of garbage mixed with other material such as sewage sludge. Another object is to provide improved garbage disposal in which the garbage is conditioned and degreased. Another object is to provide improved garbage disposal in which the garbage is comminuted and mixed with liquid, the mixture is conditioned and degreased and the solids are then concentrated. Another object of the invention is to provide improved garbage disposal in which garbage is conditioned, degreased, concentrated and dewatered. Another object is to provide improved disposal of material such as sewage sludge. Another object of the invention is to provide improved degreasing of material such as sewage sludge. A further object of the invention is to provide improved degreasing of garbage, sewage sludge and the like and improved treatment of the degreased material to produce a fertilizer base such as tankage or humus. A further object of the invention is to provide improved apparatus for degreasing garbage, sewage sludge and the like. It is also an object of the invention to provide improved apparatus for producing a fertilizer base from garbage, sewage sludge and the like.

Heretofore various methods have been used in the disposal of garbage but they have had many disadvantageous features. One of such prior methods of garbage disposal comprised the mixing of garbage with collected rubbish and the burning of the mixture in an incinerator. This method is however uneconomical in that organic matter that might be of value for fertilizer and other purposes is destroyed. Another method or process heretofore in use is the garbage reduction process in which the garbage is cooked in steam jacketed kettles and then pressed and dried, the end products being grease which may be sold to various manufacturers, and tankage which may be sold to fertilizer companies for use as a fertilizer base. The method or process of the present invention has been developed to overcome certain disadvantages inherent with both of these methods and broadly comprises grinding the garbage, extracting the grease, mechanically removing the so-called free moisture and drying the end product by thermal evaporation to make it marketable as tankage or burning the end product in a suitable incinerator.

Garbage as collected contains between 15 and 25 per cent solids. Of the dry solids 20 to 25 consists of grease and ether soluble matter. In the system of the present invention the garbage is first finely ground. This grinding serves a dual purpose, first to break the garbage into small comminuted particles so that the grease and ether soluble matter can be more readily extracted and to further prepare it for efficient drying or incineration. It is also possible to combine with this process the disposal of sewage sludge, effecting thereby economies in the disposal of both of these waste products and increasing the value of the garbage tankage as a fertilizer base.

Other objects, features and advantages will appear upon consideration of the following description and the flow diagram constituting the drawing.

Referring to the drawing, garbage is supplied to a grinder 10 in which it is ground and shredded into small particles while mixed with liquid such as water or sewage plant effluent supplied to the grinder in an amount sufficient to properly dilute the garbage particles to carry them in suspension and later assist in the removal therefrom of grease and ether soluble material. Preferably the garbage disposal is carried out in a combined garbage and sewage disposal plant in which sewage is supplied through a line or duct 11 to a sewage settling tank 12 and the effluent from the tank 12 is discharged through a line or duct 13. Effluent from the duct may be supplied to the grinder 10 through a line or duct 14 provided with suitable controlling means such as a valve 15.

Preferably the settled solids, or sludge, in the bottom of the sewage settling tank are passed through a duct 16, provided with a valve 17, to a sump or sludge receiver 18 and are withdrawn therefrom as desired, through a line or duct 19 which may be provided with a pump 20. The sludge discharged through the duct 19 may be mixed with the ground garbage and liquid discharged from the grinder 10 through a duct 21 and the mixture passed through a line or duct 22 to a suitable degreasing unit 23 of such size as to allow the proper period of detention for separating the grease and ether solubles from the garbage or mixture of garbage and sewage sludge.

When to a liquid, containing greases, oils and potassium or sodium soaps, there are added a metallic salt, for example of ferrous or ferric iron, copper, aluminum, manganese or zinc, and an alkaline producing substance such as lime, magnesia or soda ash, and the fluid mixture is agitated or agitated and aerated by means of the mechanical addition of compressed air in the form of minute bubbles and/or atmospheric oxygen absorption, there are produced insolubles consisting mostly of calcium, magnesium, iron or aluminum stearate, palmatate or oleate. By means of flotation by small bubbles of gases, preferably air, these substances may be included in a floating scum or froth which may readily be removed by decantation or by skimming. At the same time another reaction may take place in which the agitation with minute air bubbles liberates the films of oils and grease from the finely ground particles, which are then enmeshed in the froth and other insoluble matter. Agitation and mixing such as described has a further function in the washing or conditioning of sewage sludge when this is disposed of separately from or jointly with the ground garbage, which conditioning tends to improve and accelerate the removal of the free liquid from the solid particles.

In order to utilize the features referred to in the last preceding paragraph, the fluid mixture of garbage and sludge passing through the line or duct 22 to the degreasing unit 23 may be treated for conditioning purposes by the addition of lime from a supply container 24 and a suitable metallic salt from a supply container 25. The fluid supplied by the duct 22 is admitted to the lower end of a central draft tube 26 provided at its upper end with a distributor head comprising a lower splash plate 26a, a top member 27 in the form of an inverted hydraulic cone and interposed dispersion vanes (not shown). The upward flow of the fluid mixture in the draft tube may be produced by the upward movement of some gas bubbles from a gas or air diffuser 28 located in the lower part of the draft tube and supplied with compressed air or gas from a compressed air supply receptacle or tank 29 or a chlorine gas container 30 or gas from both of these sources.

The upward movement of fine bubbles through the draft tube will agitate the mixture and form a froth with the insolubles therein which froth will tend to form a scum at the top of the fluid in the tank. From the top of the draft tube the fluid or liquid will pass outwardly over the splash plate and downwardly along the sides of the tank 26 being prevented from flowing directly to the outlet at the central portion of the tank by suitable means such as a cylindrical baffle 31 at the outside of which the frothy portion may collect at the surface of the tank and pass into a scum gutter 32 from which it may be withdrawn through a duct 33, and taken to any desired point for further treatment.

Part of the fluid passing downwardly at the side of the tank of the degreasing unit 23 passes upwardly again through the draft tube 26 but part of the liquid in the lower part of this tank moves upwardly inside the baffle 31, flows over the top of an annular channel 34 surrounding the draft tube, and passes out of the degreasing unit through a duct or pipe 35 to a concentration and thickening unit or tank 36 where it may be retained for a sufficient time to allow the solids to separate partially from the liquid under the force of gravity, and to collect sludge in the lower part of the tank.

As the sludge collects in the bottom portion of the concentration tank 36, it may be worked by suitable means, such as rakes 37, to a central outlet and discharged into a line or duct 38 provided with a valve 39 and leading to a dewatering device 40 which may be a centrifuge or a vacuum filter. Due to the thickness of the sludge the line 38 may be provided with a sludge pump 41 to feed the sludge to the dewatering device. The liquid extracted from the sludge by the dewatering device 40 may be returned to the concentration unit or tank 36 through a line or duct 42 preferably discharging into the line 35 connecting the degreasing unit with the concentration unit. The dewatered solids may be disposed of in any suitable manner as will be described hereinafter.

The supernatant liquid in the central part of the concentration unit 36 flows over the top of the wall of the tank proper into an annular channel 43 containing a filter bed 44 which divides the channel into an upper influent portion and a lower effluent portion 45 receiving filtrate passing through the filter bed. From the effluent portion or chamber 45 the filtrate or effluent may pass through suitable openings 46 into an annular effluent chamber 47 from which the liquid may be returned to the sewage supply line 11 through a line or duct 48 provided with a pump 49. The concentration unit 36 may be of a known type in which the cleaning of the filter bed 44 may be effected by use of an overhead cleaner.

In the event that it is not necessary to pass the sewage sludge through the degreasing unit 23, the sludge may be passed directly from the duct 19 to the duct 35 through a line or duct 50 provided with a valve 51. Preferably the line 19 is provided with valves 52 at opposite sides of the connection with duct 50.

The dewatered solids discharged from the dewatering device 40 may be disposed of in any suitable manner. For example, these solids may be reduced to humus by fermentation in a fermentation cell or, after drying, they may be used as tankage or they may be burned. It will be understood that the humus is of value as a fertilizer base and that the same is true of the tankage.

As illustrated on the drawing, the dewatering solids when discharged from the dewatering unit 40 are deposited on a conveyor 53 which discharges into a hopper 54 in which it may be mixed with other material. From the hopper 54 the material is passed into a chute 55 passing through the top of a dryer in the form of a tiered multiple hearth furnace 56 provided with mechanical rabbling means (not shown) by which the material is moved inwardly and outwardly on successive hearths for discharge downwardly through outlets at the centers or peripheries of the respective hearths. The chute 55 may be provided with a weighted gate 57 which permits the downward passage of dewatered solids when a sufficient amount has collected thereon, but prevents any substantial flow of air or gases therethrough.

The dried material or tankage may be discharged from the lower part of the drying furnace or dryer through a chute 58 into a bin 59 provided at its bottom with a sliding door 60 to enable removal of the dried material or tankage as desired. In order to assist the drying action when the percentage of moisture in the dewatered solids is too high, small amounts of dried material may be withdrawn from the bin 59 and passed through a branch outlet 61 controlled by a flap 62 to an enclosed conveyor 63 by which it is hoisted above the top of the dryer and dumped into the hopper 54 to be mixed with the dewatered solids and assist in drying the dewatered solids.

It should be understood that in the dryer 56 the free and inert moisture in the dewatered ground garbage and sewage sludge is reduced to the point at which it is not objectionable when the product is disposed of as tankage or fertilizer base, or to a point at which the mixture is readily combustible.

If the dried material is to be burned or incinerated, it is removed through a chute 64 controlled by a valve in the form of a slide 65 and also by a weighted gate 66. From the chute 64 the material is discharged into a hopper 67 at the upper end of a chute 68 provided with weighted gates 68a through the top of an incinerator 69 indicated as a basket grate incinerator. As shown the hopper 67 is of such size that combustible material such as rubbish may be added both for disposal of the rubbish and for utilization as fuel. In the incinerator 69, the hot gases of combustion pass from the furnace or burning chamber 70 over a high wall 71 into a gas combustion chamber 72 and then beneath a downwardly extending wall 73 into a final chamber 74 from which the gases of combustion pass into a flue 75.

In this particular form of apparatus the drying of the material in the dryer 56 is obtained by passing hot combustion gases from the chamber 74 into the upper part of the dryer as by means of a duct 76 provided with a fan 77, and passing gases, laden with moisture, from the lower part of the dryer through a duct 77a to the combustion chamber 72 where very high temperatures are maintained and any odors may be burned out of the gases.

The gases discharged from the chamber 74 may be utilized to generate steam in a steam generator 78 and then passed to a stack 79. The steam generated in steam generator 78 may be utilized to run a prime mover 80 and thereby operate an electric generator 81.

From the foregoing it will be evident that the present invention provides for effective and economical degreasing of garbage, sewage sludge and a mixture of garbage and sewage sludge, and further for effective and economical preparation of tankage or a suitable fertilizer base, in which preparation the material is thoroughly degreased.

It should be understood that various changes may be made and that certain features may be used without others without departing from the true scope and spirit of the invention.

Having thus described my invention, I claim:

1. In a degreasing unit, the combination with a tank, a central draft tube, means for introducing an influent mixture of liquid and comminuted material into the lower part of the draft tube and means for distributing the mixture passing from the upper end of the draft tube over the surface of the mixture in said tank, of means for introducing fine bubbles of gas into the lower part of the draft tube to effect an upward flow therethrough and to produce a froth adapted to take up the grease and form at the surface of the mixture in the tank a scum which can readily be removed, and baffle means preventing the downwardly flowing mixture at the periphery of the tank from passing directly into said central portion of the tank thereby enabling the collection of said scum at the surface, and means for withdrawing the degreased mixture from the central part of the tank above the lower limit of said baffle means, such withdrawing means comprising an annular channel surrounding the draft tube and receiving the degreased mixture from above, and means for discharging the degreased mixture from said channel to the outside of said tank.

2. In a degreasing unit, the combination with a tank, a central draft tube, means for introducing an influent mixture of liquid and comminuted material into the lower part of the draft tube and means for distributing the mixture passing from the upper end of the draft tube over the surface of the mixture in said tank, of means for introducing fine bubbles of gas into the lower part of the draft tube to effect an upward flow therethrough and to produce a froth adapted to take up the grease and form at the surface of the material in the tank a scum which can readily be removed, scum-decanting means at the periphery of said tank, means for withdrawing the degreased material from the central part of the tank and a cylindrical baffle preventing the downwardly flowing liquid at the periphery of the tank from passing directly to said central portion of the tank thereby enabling the collection of said scum at the surface.

3. The combination of means for separating the sewage in a sewage stream into sludge and effluent, a device for comminuting garbage in connection with the desired amount of said effluent, means for mixing sewage sludge thus separated with the mixture of comminuted garbage and effluent, means for conditioning the garbage-sludge mixture, means for degreasing the conditioned garbage-sludge mixture by agitation with fine bubbles of gas to form a froth and effect flotation by means of said froth, means for decanting said froth, a thickener to separate the solids from the effluent in said mixture received from the degreasing means, means for returning the liquid from the thickener to the sewage stream, means for dewatering the thickened solids, and means for returning to the thickener liquid discharged from said dewatering means.

4. The combination of means for separating the sewage in a sewage stream into sludge and effluent, a device for comminuting garbage mixed with the desired amount of said effluent, means for mixing sewage sludge thus separated with the mixture of comminuted garbage and effluent, means for conditioning the garbage-sludge mixture, means for degreasing the conditioned garbage-sludge mixture by agitation with fine bubbles of gas to form a froth and effect flotation by means of said froth, means for decanting said froth, a thickener to separate the solids from the effluent in said mixture received from the degreasing means, means for returning the liquid from the thickener to the sewage stream, a device for dewatering the thickened solids, and by-passing means for conducting sewage sludge past the degreasing means and the thickener to the dewatering means.

PHILIP B. STREANDER.